Sept. 25, 1928.  E. M. PFAUSER  1,685,503

SOCKET WRENCH

Filed May 19, 1927

Inventor:
Edward M. Pfauser

Patented Sept. 25, 1928.

1,685,503

UNITED STATES PATENT OFFICE.

EDWARD M. PFAUSER, OF MILWAUKEE, WISCONSIN, ASSIGNOR TO BLACKHAWK MANUFACTURING COMPANY, OF MILWAUKEE, WISCONSIN.

SOCKET WRENCH.

Application filed May 19, 1927. Serial No. 192,745.

This invention relates to socket wrenches.

Objects of this invention are to provide a novel form of socket wrench which is so constructed that either a positive lock or a frictional lock may be secured between the manipulating stem and the socketed head and in which a mode of locking the devices may be had which provides different degrees of frictional locking.

An embodiment of the invention is shown in the accompanying drawings in which.

Figure 1:
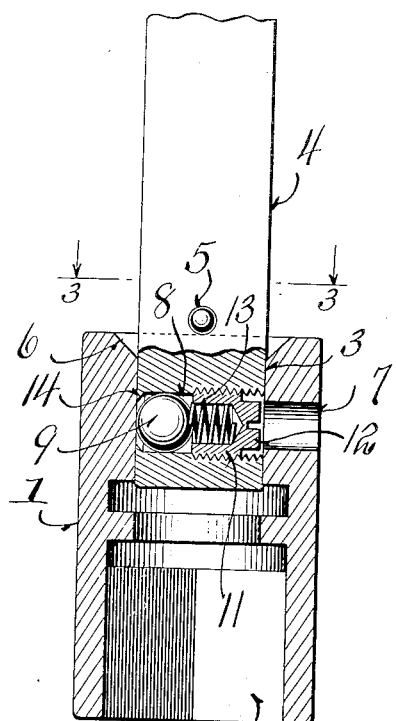
Figure 1 is a sectional view through the head of the wrench with part of the manipulating stem shown in section, showing the device in one position of adjustment, such view corresponding to a section on the line 1—1 of Figure 3.

Referring to the drawings, it will be seen that the wrench comprises a head 1 provided with a polygonal socket 2 adapted to receive a nut or bolt head. The upper end of the head 1 is provided with a rectangular socketed portion 3 for the reception of the rectangular manipulating shank or handle portion 4. This handle portion is provided with a pin 5 extending transversely thereof to limit the amount of insertion of such handle or shank within the head. Preferably, also the head is provided with a bevelled portion 6 and a transverse aperture 7, for a purpose hereinafter to appear.

Figure 2:
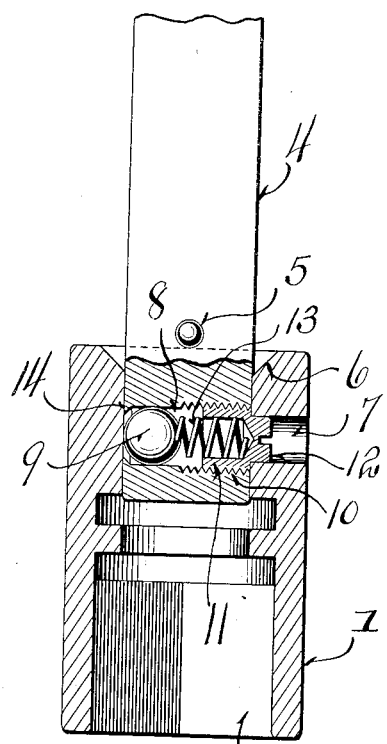
Figure 2 is a view similar to Figure 1 showing the parts positively locked.
Figure 3:
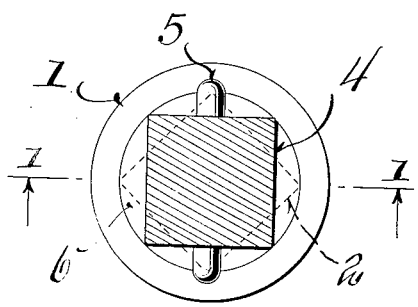
Figure 3 is a sectional view on the line 3—3 of Figure 1.

The shank is provided with an aperture 8 for the reception of a steel ball 9 and preferably a portion of this aperture is threaded, as indicated at 10, to receive the threaded enlarged portion 11 of a compression stud. This compression stud is also provided with a slotted and reduced head 12 adapted to receive the end of a screw driver. When it is desired to positively lock the parts together, as shown in Figure 2, the shank is slipped into the head, as shown in the figure, and the plug is backed out, so that the reduced portion 12 fits within the aperture 7. The shoulder between the reduced portion 12 and the enlarged threaded body 11 of the plug limits the outward motion of the plug and prevents loss thereof.

It is to be noted that the plug is recessed and carries a spring 13 which bears against the ball 9 and thus urges the ball outwardly. The ball is prevented from passing completely from the aperture 8 by means of the inwardly swaged lip 14 which surrounds the outer end of the aperture and thus provides an outer end of the aperture smaller than the ball.

It is to be noted also that when the plug is screwed inwardly, all the way, as far as the threads permit, as shown in Figure 1, that it can not engage the ball, and thus can not wedge the ball unyielding against the side of the socketed portion 3 of the head.

The device may be used so as to provide a frictional binding engagement between the shank and the head. For example, as shown in Figure 1, the shank may be slipped into place with the ball bearing against one of the flat inner faces of the upper socket 3. If a more secure grip is desired, the shank may be rotated 180° about its axis and slipped into place. The ball will then snap partly into the recess 7 in the head 1. If a more secure connection is desired, the parts may be assembled, as shown in Figure 2, and the plug backed out to position its reduced portion 12 within the aperture 7 and to thus positively lock the parts together. It is to be noted that the transverse pin 5 limits the extent to which the shank may be inserted in the head and from Figures 1 and 2, it is apparent that this pin when contacting with the upper end of the shank, insures the correct alignment of the holes 7 and 8.

Further, it is not necessary to form an integral shoulder on the shank 4 to secure this correct positioning of the parts and, consequently, the shank may be formed of the same size throughout, thus materially lessening the cost of manufacture.

It will be seen, therefore, that a very simple type of socket wrench has been provided in which either a frictional or a positive connection between the shank and the socketed head may be secured, and it will be seen also that there is no danger of loss of the parts. Although the invention has been described in considerable detail, such description is intended as illustrative rather than limiting as the invention may be variously embodied and as the scope of such invention is to be determined as claimed.

I claim:

1. A socket wrench comprising a head having a socketed portion at its lower end for the reception of a nut and having a polygonal socket at its upper end, said head having a transverse aperture opening into the upper socket, a shank contoured to fit the upper socket and having a transverse aperture therethrough, a pin extending transversely through said shank and adapted to contact with the upper end of said head when the apertures are in alignment, a ball carried within the aperture in said shank, a screw threaded plug screwed into the aperture in said shank, a spring interposed between said plug and said ball, said plug having a shouldered portion and having a projecting reduced head slotted and adapted to enter the aperture in said shank, the shouldered portion of said plug limiting the outward motion thereof and adapted to contact with the inner face, of the upper socket of said head.

2. A two-piece socket wrench comprising a head socketed for the reception of a nut, and a handle for attachment with said head, one of said members having a socket therein of polygonal contour and provided with a transverse aperture, the other of said members having a shank for engagement in said polygonal recess and provided with a transverse aperture adapted to aline with the first mentioned aperture and of larger diameter than said first mentioned aperture, a ball carried within the aperture of said shank, a plug threaded into said shank aperture and provided with a reduced head for engagement in the first mentioned recess, to positively lock the members together, and a spring interposed between said ball and said plug.

In testimony that I claim the foregoing I have hereunto set my hand at Milwaukee, in the county of Milwaukee and State of Wisconsin.

EDWARD M. PFAUSER.